United States Patent [19]

Stephens

[11] Patent Number: 4,967,464
[45] Date of Patent: Nov. 6, 1990

[54] METHOD OF MAKING A SWITCHED RELUCTANCE MOTOR HAVING PLURAL-STAGE FORM-WOUND COIL WINDING

[75] Inventor: Charles M. Stephens, Pattersonville, N.Y.

[73] Assignee: General Electric Company, Schenectady, N.Y.

[21] Appl. No.: 430,545

[22] Filed: Nov. 2, 1989

Related U.S. Application Data

[62] Division of Ser. No. 327,628, Mar. 24, 1989, abandoned.

[51] Int. Cl.⁵ .......................................... H02K 15/085
[52] U.S. Cl. ...................................... 29/596; 29/606; 310/42
[58] Field of Search ................ 29/596, 598, 605, 606; 310/42, 154, 155, 179, 180, 194

[56] References Cited

U.S. PATENT DOCUMENTS 3,802,066  4/1974  Barrett ................................ 29/596
4,684,867  8/1987  Miller et al. ........................ 318/701

Primary Examiner—Carl E. Hall
Attorney, Agent, or Firm—Jill M. Breedlove; James C. Davis, Jr.; Marvin Snyder

[57] ABSTRACT

Plural-stage form-wound stator pole coil windings for a switched reluctance motor utilize a greater portion of the interpole space than conventional windings, thereby increasing production of magnetic flux. In a two-stage form-wound coil winding, the first stage comprises an inner coil winding which fits directly around a stator pole. The second stage comprises an outer coil winding which fits directly around the first coil winding. All outer coil windings are applied to the stator before inserting the inner coil windings into the outer coil windings and electrically connecting the inner coil windings thereto. Torque production and output voltage are increased, resulting in a highly efficient motor.

5 Claims, 4 Drawing Sheets

METHOD OF MAKING A SWITCHED RELUCTANCE MOTOR HAVING PLURAL-STAGE FORM-WOUND COIL WINDING

This application is a division of application Ser. No. 07/327,628, filed Mar. 24, 1989, now abandoned.

FIELD OF THE INVENTION

This invention relates generally to stator pole coil windings for switched reluctance motors. More particularly, this invention relates to form-wound coil windings for a switched reluctance motor, each comprising plural winding stages which are assembled sequentially.

BACKGROUND OF THE INVENTION

Switched reluctance motors (SRMs) are doubly salient machines; that is, they have multiple poles on both the stator and the rotor. Moreover, there are coil windings on the stator, but no windings or magnets on the rotor. In a SRM, each motor phase comprises at least one pair of diametrically opposite stator poles, each stator pole having a coil winding wound thereon. The stator pole coil windings comprising each motor phase winding are connected in series or in parallel, so that when a phase winding is excited, magnetic flux produced in the corresponding pair(s) of stator poles combines additively. Upon excitation of a motor phase by supplying current to the corresponding stator pole coil windings, a magnetic force of attraction results between the excited stator pole pair(s) and the nearest rotor poles, thereby causing the rotor to rotate. Current is switched off in the excited motor phase winding before the rotor poles rotate past the aligned position; otherwise, the magnetic force of attraction would produce a negative or braking torque. Continuous rotation of the rotor is achieved by sequentially switching on and off adjacent motor phases. To excite the motor phases, undirectional current pulses synchronized with rotor movement are supplied to the motor phase windings by a converter. Exemplary SRM converters are illustrated in commonly assigned U.S. Pat. No. 4,684,867, issued to T. J. E. Miller on Aug. 4, 1987.

In general, during manufacture of a switched reluctance motor, the coil windings are wound as subassemblies and then applied to the stator poles because, as is well-known by those skilled in the art, the stator poles of a SRM are integral parts of the stator, i.e. are not removable, in contrast to, for example, stator poles of dc commutator-type machines. Disadvantageously, this conventional stator assembly process necessarily leaves unused spaced in each interpole region. That is, in order for a coil being assembled onto a stator pole to be able to clear adjacent windings that have been assembled previously, the width of the coil is restricted. As a result, for a particular SRM, maximum attainable flux, and hence output torque and voltage, are limited.

OBJECTS OF THE INVENTION

It is, therefore, an object of the present invention to provide stator pole coil windings for a switched reluctance motor which utilize a larger portion of the interpole space than conventional coil windings, thereby enabling production of increased flux per unit of current and, thus, proportionately higher torque and voltage output.

Another object of the present invention is to provide stator pole coil windings for a switched reluctance motor which result in lower conductor losses per unit of applied power than conventional coil windings.

Still another object of the present invention is to provide a method of making coil windings for a switched reluctance motor, each of which utilize a larger portion of the interpole space than conventional coil windings, thus resulting in a more highly efficient motor.

SUMMARY OF THE INVENTION

The foregoing and other objects are achieved in a plural-stage, form-wound coil winding for a switched reluctance motor. In particular, in a two-stage form-wound coil winding, the first stage comprises an inner coil winding which is rectangular in cross-section and fits directly, i.e. closely, around a stator pole of the SRM. The second stage comprises an outer coil winding which is also rectangular in cross-section and fits directly around the first coil winding. The inner and outer coil windings are form-wound, i.e., separately wound as subassemblies before application to the stator poles.

During SRM stator assembly, each outer coil is assembled around the respective stator pole. After all of the outer coils have been assembled onto the stator, each inner coil is then inserted into the corresponding outer coil. The inner and outer coils on each stator pole are connected in series to each other so as to preserve the same general winding direction. Finally, the stator pole coil windings comprising each motor phase winding are connected in series or in parallel.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
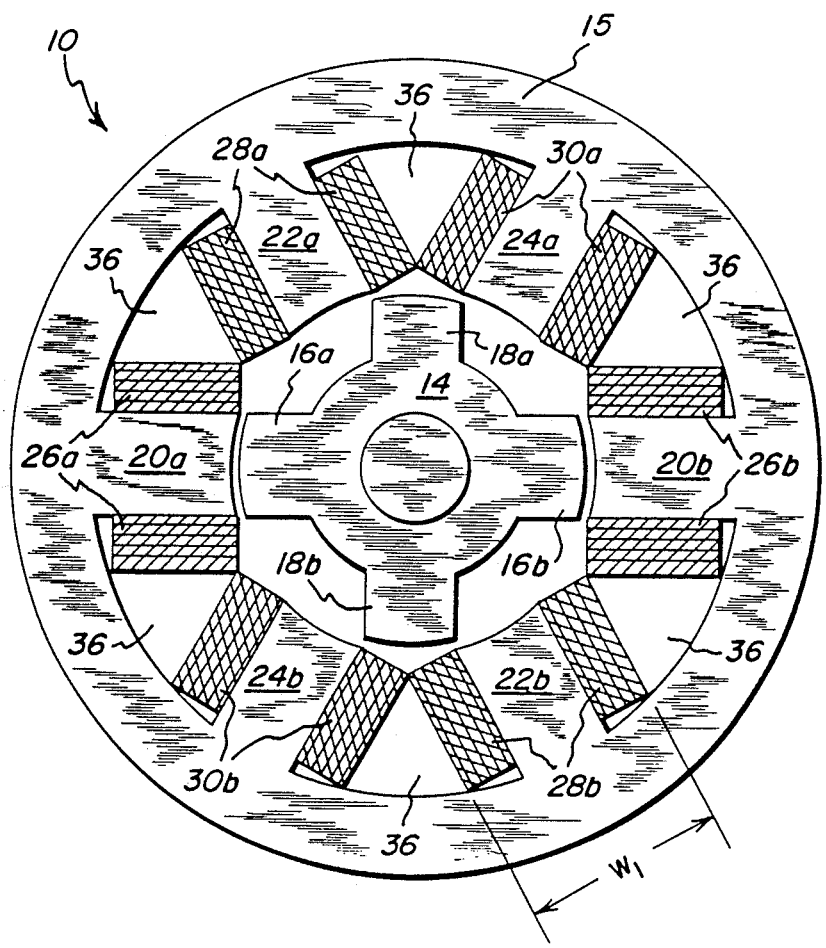
FIG. 1 is a cross-sectional view of a conventional switched reluctance motor.

FIG. 1 is a cross-sectional view of a switched reluctance motor (SRM) 10 having conventional stator pole coil windings. By way of example, SRM 10 is illustrated as a three-phase machine, each motor phase comprising one pair of diametrically opposite stator poles. However, it is to be understood that the principles of the present invention apply to SRMs having any number of phases and, thus, any number of stator poles.

Figure 2:
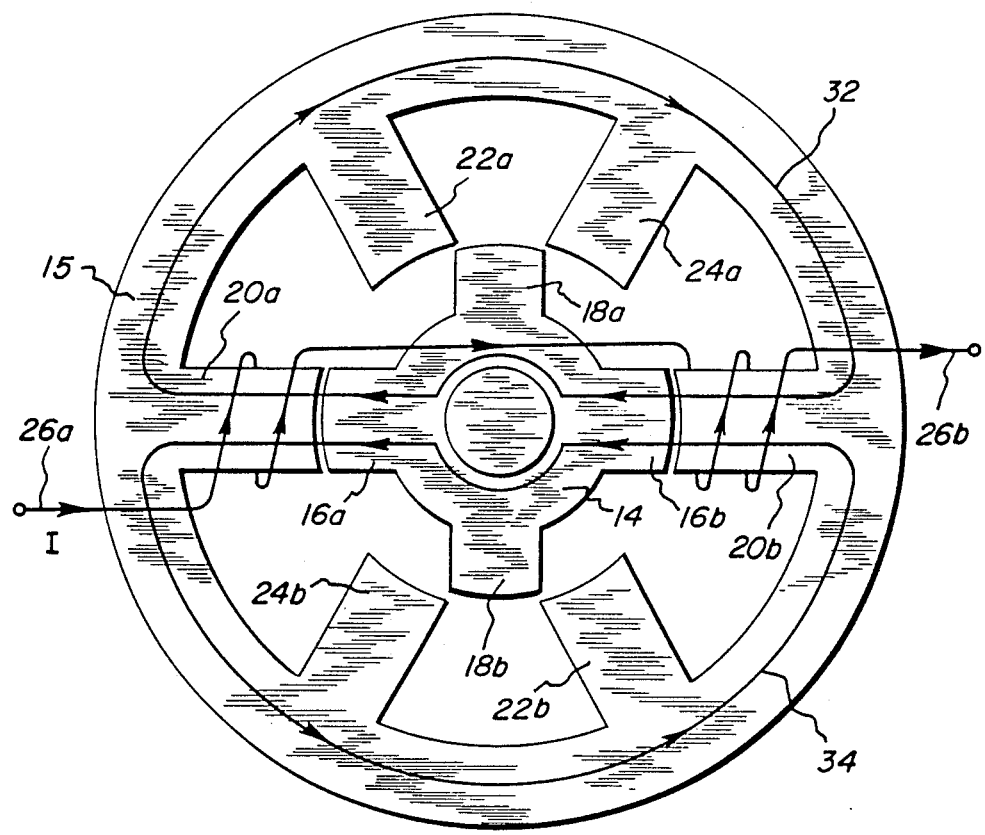
FIG. 2 is a cross-sectional view of a SRM illustrating the direction of current in an exemplary motor phase winding and further illustrating the direction of magnetic flux resulting therefrom.

As shown, SRM 10 includes a rotor 14 rotatable in either a forward or reverse direction within a stationary stator 15. Rotor 14 has two pairs of diametrically opposite rotor poles 16a–16b and 18a–18b. Stator 15 has three pairs of diametrically opposite stator poles 20a–20b, 22a–22b, and 24a–24b. Conventional stator pole coil windings 26a, 26b, 28a, 28b, 30a and 30b, respectively, are wound on stator poles 20a, 20b, 22a, 22b, 24a and 24b, respectively. The stator pole coil windings on each pair of opposing or companion stator pole pairs are connected in series or parallel to form a motor phase winding. As shown in FIG. 2, the current I in each phase produces a magnetic flux linkage by generating flux in the directions indicated by arrows 32 and 34. For example, as shown, windings 26a and 26b are connected in series so that current I flows in the direction indicated.

As hereinabove stated, during manufacture of a typical SRM, the stator pole coil windings are wound as subassemblies, hereinafter designated form-wound coil windings, and then applied to the respective stator poles. The number of turns and type of conductor used to make the coil windings for a particular SRM depend upon the intended application therefor. For windings comprised of a relatively low number of turns of a heavy gauge conductor, the windings are each formed into a predetermined coil shape corresponding to the size of the respective stator poles, the stiffness of the heavy gauge conductor retaining the shape of the coil after the conductors have been form-wound. The conductors comprising the form-wound coil are tightly packed. Alternatively, depending upon the SRM and its intended use, a form-wound coil can be wound from many turns of a light gauge conductor, provided that the turns are wrapped around a nonmetallic bobbin to retain the coil shape.

In order to apply the form-wound coil windings to the stator poles, as hereinabove described, there is a maximum coil width $W_1$ which allows sufficient clearance for assembly of the adjacent coil windings. Thus, a significant portion of each interpole space 36 is unoccupied by coil windings, as illustrated in FIG. 1. This limitation on usable interpole space, in turn, restricts maximum attainable flux and, hence, output torque and voltage.

Figure 3:
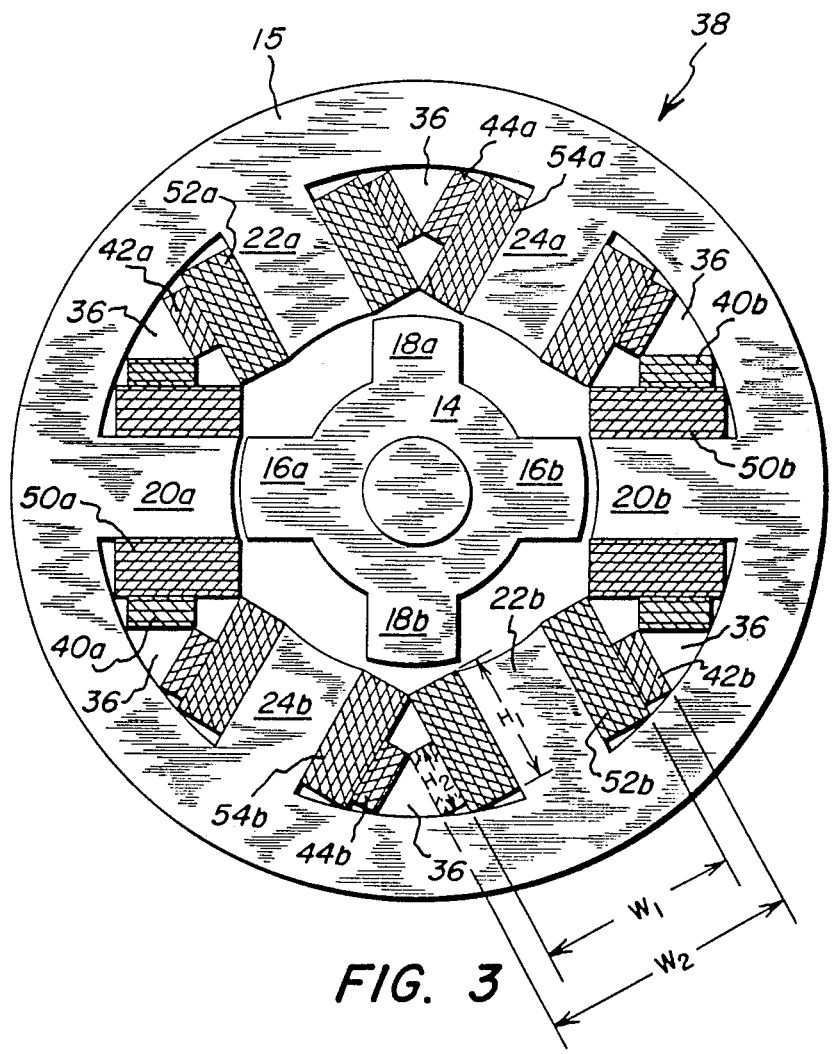
FIG. 3 is a cross-sectional view of a switched reluctance motor including stator pole coil windings in accordance with the present invention.

FIG. 3 shows a SRM 38 employing the two-stage stator pole coil windings of the present invention. Each stator pole coil winding comprises an outer coil winding 40a, 40b, 42a, 42b, 44a and 44b, respectively, and an inner coil winding 50a, 50b, 52a, 52b, 54a and 54b, respectively. The outer coil winding and inner coil winding comprising each stator pole coil winding are form-wound separately. To maximize use of each interpole space 36, the inner and outer windings each preferably have a substantially rectangular cross-section, as illustrated. Moreover, for equivalent-sized SRMs, the width $W_1$ of the inner coil winding of the present invention is preferably equal to that of the conventional coil winding shown in FIG. 1. Also like the conventional coil winding, the inner coil is sized to fit directly, i.e. closely, around the corresponding stator pole. With the inner coil winding dimensions as hereinabove described, the height $H_2$ of the outer coil winding is required to be less than the height $H_1$ of the inner coil winding, as shown in FIG. 3. The outer coil winding is sized to fit directly around the corresponding inner coil winding, and the width $W_2$ of the outer coil winding is limited by the clearance necessary for assembly, to be described hereinafter in detail.

Figure 4:
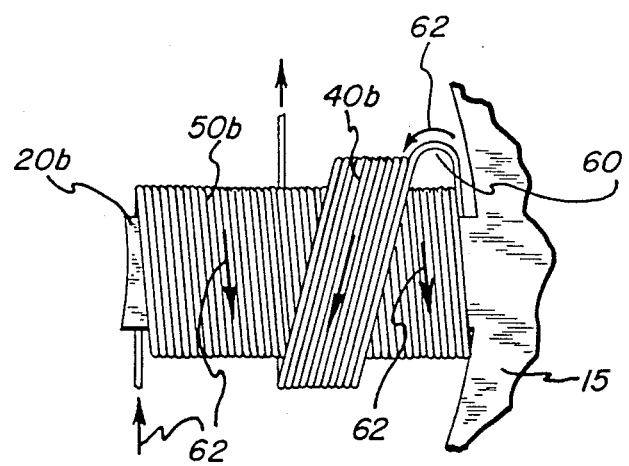
FIG. 4 is a side view of a stator pole of a SRM including an inner coil winding and an outer coil winding connected in series in accordance with the present invention.

In accordance with the present invention, during SRM stator assembly, outer coil windings 40a, 40b, 42a, 42b, 44a and 44b are applied to stator poles 20a, 20b, 22a, 22b, 24a and 24b, respectively, before any inner coil windings are applied thereto. With each outer coil winding in place about the corresponding stator pole, each inner coil winding 50a, 50b, 52a, 52b, 54a and 54b is inserted into an outer coil winding 40a, 40b, 42a, 42b, 44a and 44b, respectively, while being fitted directly around the corresponding stator pole. Each outer coil winding is then connected in series to the respective inner coil winding to preserve the same general winding direction. For example, as shown in FIG. 4, outer coil winding 40b and inner coil winding 50b are connected in series at location 60, with arrows 62 illustrating an exemplary winding direction. Lastly, the diametrically opposite stator pole coil windings are connected in series or parallel, as desired, so that the resulting magnetic flux patterns are similar to those of the conventional SRM, as illustrated in FIG. 2.

By utilizing the two-stage stator pole coil windings of the present invention, magnetic flux production is significantly increased. Hence, torque and voltage output per unit of current are proportionately increased, thereby resulting in a more efficient SRM. Additionally, by employing the two-stage windings according to the present invention, so as to utilize a significantly larger portion of the interpole space, conductor losses per unit of applied power are decreased, thus further enhancing SRM efficiency.

While the preferred embodiments of the present invention have been shown and described herein, it will be obvious that such embodiments are provided by way of example only. Numerous variations, changes and substitutions will occur to those of skill in the art without departing from the invention herein. For example, a three-stage coil winding comprising an inner coil winding, a first outer coil winding and a second outer coil winding may be constructed in accordance with the present invention. To assemble a stator comprising a three-stage coil winding, the winding stages are applied to the stator poles sequentially as follows: all first outer coil windings; all second outer coil windings; and, lastly, all inner coil windings. In like fashion, the principles of the present invention may be extended to four winding stages and so forth. Accordingly, it is intended that the invention be limited only by the spirit and scope of the appended claims.

What is claimed is:

1. A method for making a concentrated stator pole coil winding for a switched reluctance motor, said motor including a rotor and a stator, said rotor having a plurality of rotor poles, said stator having a plurality of opposing stator poles, said method comprising:

form-winding an inner coil winding, said inner coil winding having a substantially rectangular cross-section and being adapted to fit directly around one of said stator form-winding an outer coil winding, said outer coil winding having a substantially rectangular cross-section and being adapted to fit directly around said inner coil winding;

placing said outer coil winding around the corresponding one of said stator poles; then inserting said inner coil winding into said outer coil winding; and electrically connecting said inner coil winding and said outer coil winding in series.

2. The method of claim 1 wherein the height of said outer coil winding is less than the height of said inner coil winding.

3. A method for assembling a stator for a multiphase switched reluctance motor, said stator having a plurality of pairs of opposing stator poles, each pole of said stator having a concentrated stator pole coil winding wound thereon, each phase of said motor comprising at least one said pair of opposing stator poles and the stator pole coil windings wound thereon, said method comprising the steps of:

form-winding a plurality of inner coil windings, each said inner coil winding having a substantially rectangular cross-section and being adapted to fit directly around one of said stator poles;

form-winding a plurality of outer coil windings, each said outer coil winding having a substantially rectangular cross-section and being adapted to fit around the corresponding inner coil winding;

placing each of said outer coil windings, respectively, around one of said stator poles, respectively; then inserting each of said inner coil windings, respectively, into the corresponding outer coil winding;

electrically connecting each of said inner coil windings and the corresponding outer coil winding in series to form the respective stator pole coil winding; and electrically connecting the stator pole coil windings corresponding to each phase of said motor together.

4. The method of claim 3 wherein the height of each of said outer coil windings, respectively, is less than the height of each of said inner coil windings, respectively.

5. The method of claim 3 wherein each of said outer coil windings fits directly around the corresponding inner coil winding.

* * * * *